United States Patent [19]

Watkins et al.

[11] Patent Number: 4,991,058
[45] Date of Patent: Feb. 5, 1991

[54] CARD HOUSING ATTACHMENT FOR A PORTABLE COMPUTER

[75] Inventors: Lee A. Watkins, San Jose; Scott K. Smader, Cupertino; Harold S. Long, Santa Clara, all of Calif.

[73] Assignee: Grid Systems Corporation, Fremont, Calif.

[21] Appl. No.: 434,807

[22] Filed: Nov. 9, 1989

[51] Int. Cl.⁵ .............................................. H05K 7/16
[52] U.S. Cl. ................................... 361/391; 361/394; 361/399; 364/708
[58] Field of Search ................... 14/100, 106; 307/150; 361/380, 391–392, 394–395, 399, 413, 415; 364/708

[56] References Cited

U.S. PATENT DOCUMENTS

| 4,388,671 | 6/1983 | Hall et al. | 361/391 |
| 4,590,943 | 5/1986 | Paull et al. | 307/150 |
| 4,715,385 | 12/1987 | Cudahy et al. | 364/708 |

Primary Examiner—Gregory D. Thompson
Attorney, Agent, or Firm—Donald C. Feix

[57] ABSTRACT

A card housing attachment for adding industry standard add-on cards to a portable computer includes a card housing which is positioned on the top of the computer behind a tiltable display. A battery compartment slide-in structure slides into and out of a battery tray compartment opening in the back side of the computer and contains interconnect-card structure for developing the power and any clock required for the add-in card and for transmitting all necessary control signals and data lines between the add-on card and the computer bus.

8 Claims, 5 Drawing Sheets

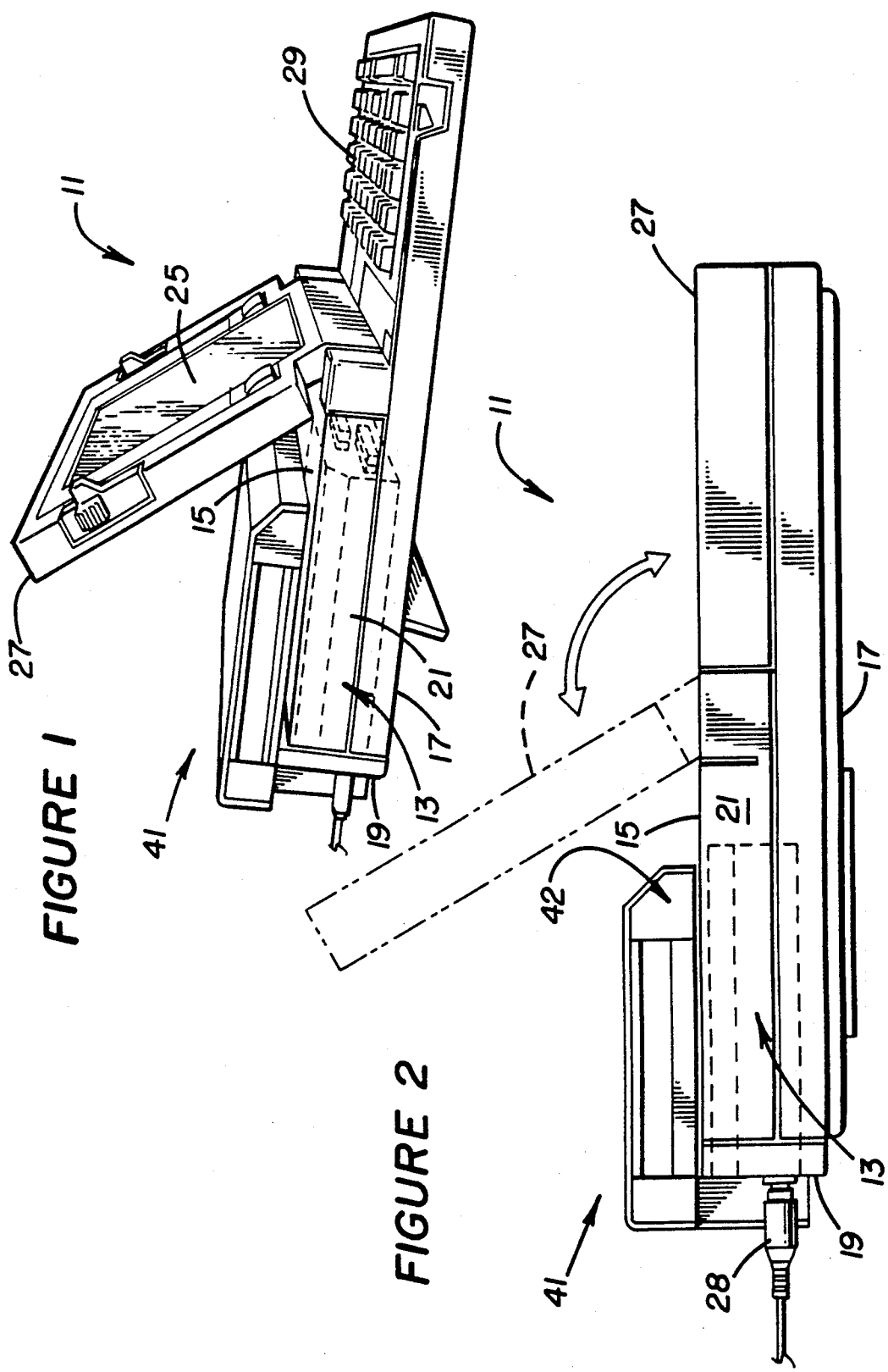

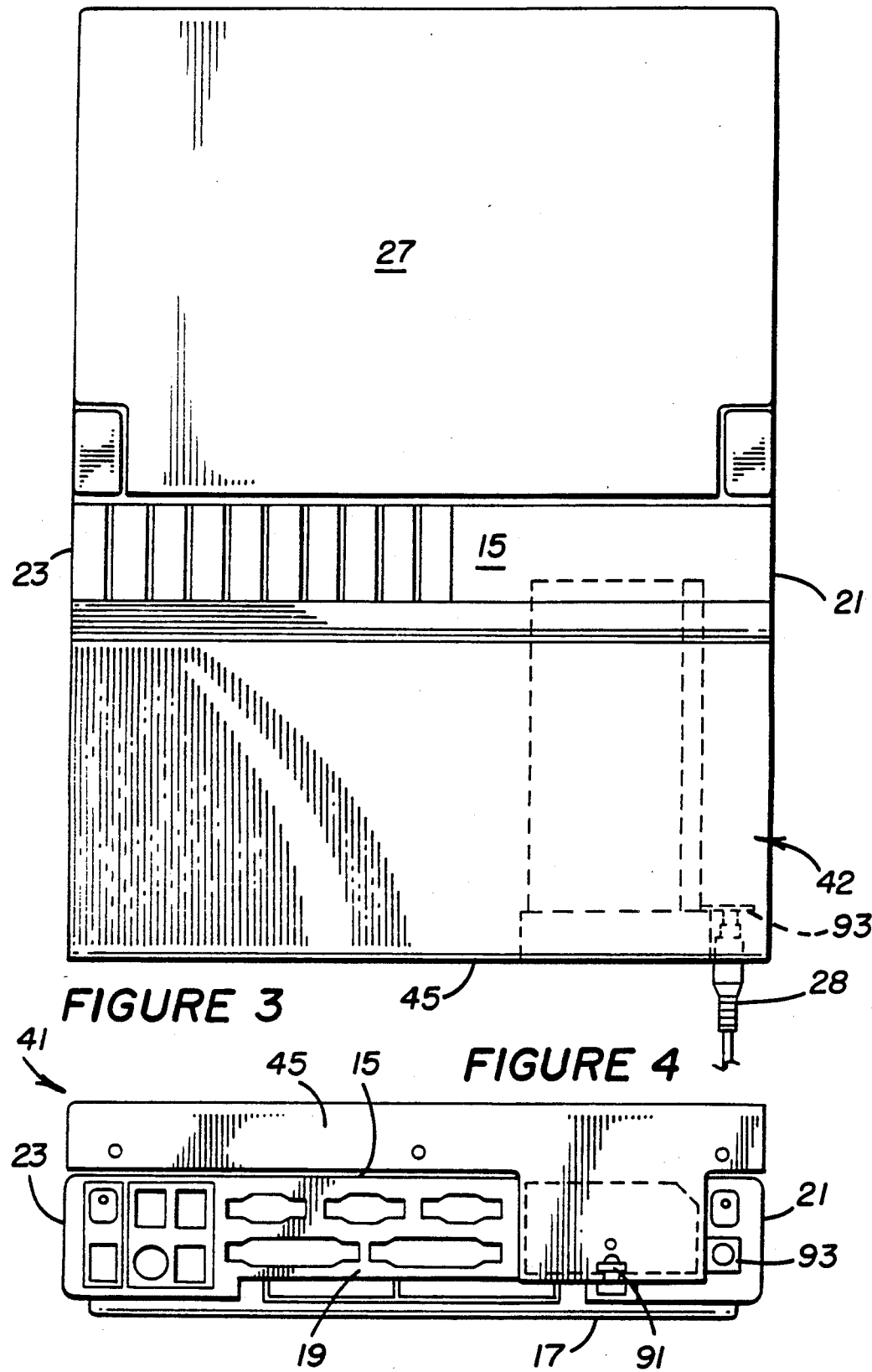

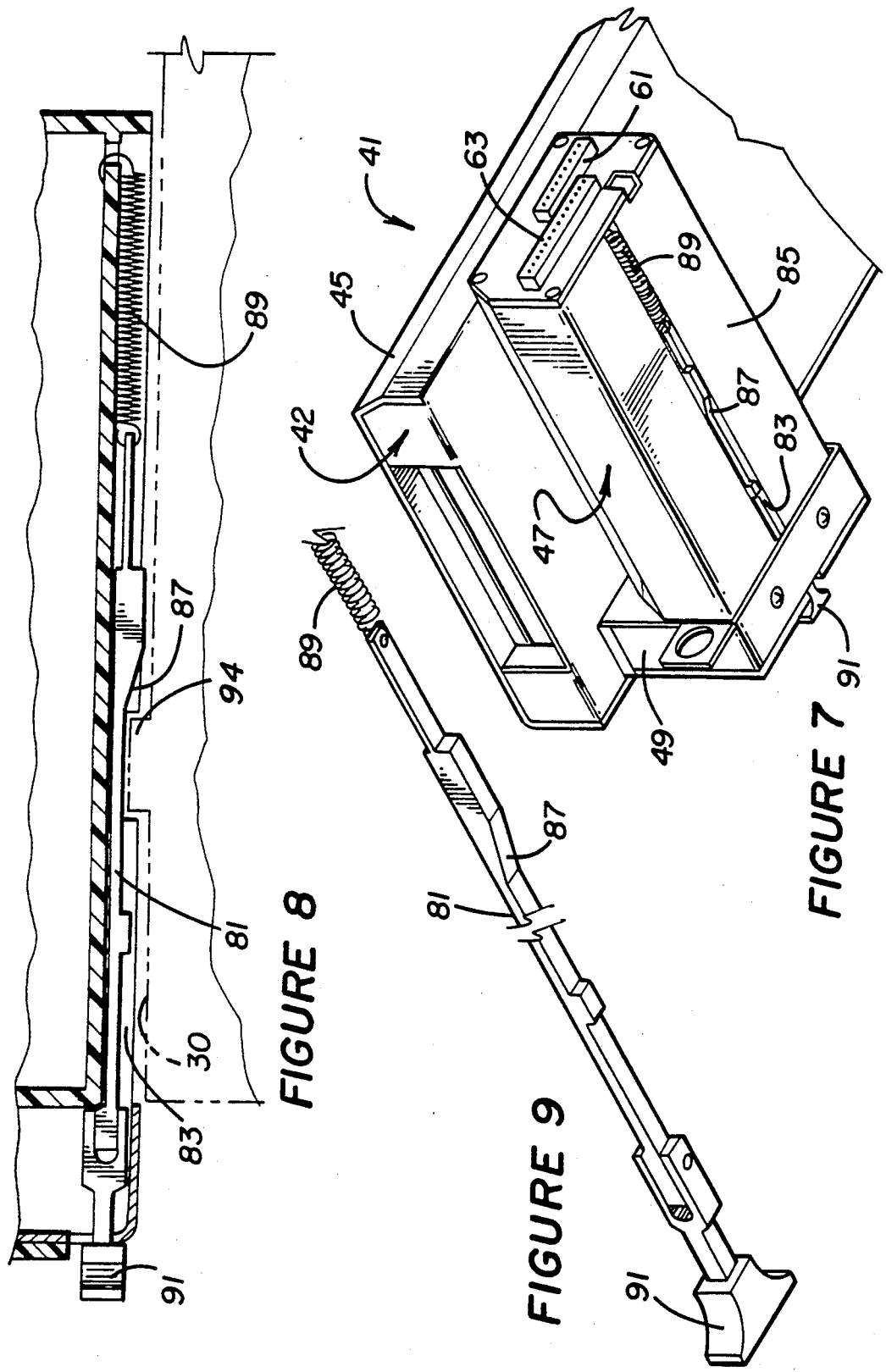

CARD HOUSING ATTACHMENT FOR A PORTABLE COMPUTER

BACKGROUND OF THE INVENTION

This invention relates to a portable computer.

It relates particularly to a card housing attachment for use with a portable computer of the kind having a battery tray compartment with an opening in the back side of the computer.

The card housing attachment of the present invention comprises an upper housing (for enclosing and mounting a selected add-on card) and a battery compartment slide-in structure (which is insertable into a battery tray compartment opening in the back side of the portable computer).

The battery tray compartment slide-in structure plugs into the main bus of the computer to supply power to the add-on card and to transmit control signals and data between the add-on card and the computer bus.

The card housing is a compact structure which fits on the top side of the case of the portable computer near the rear of the computer. In this location the card housing does not require any additional desk space and permits the display of the portable computer to be tilted back to its usual operative position without any interference to the tilting of the display or to any other components of the portable computer.

There are a large number and variety of add-on cards which have been developed for providing enhanced operation and/or additional functions for microprocessor based computers. Many of these add-on cards have become industry standard add-on cards, and many of the add-on cards are made primarily for plug-in attachment to an existing slot in the chassis of a desk top computer.

Portable computers often do not have such existing slots (or even the required space for such slots) within the outer, protective case of the portable computers. It is therefore often not possible to accommodate the plug-in addition of such industry standard add-on cards within the interior of the outer, protective case of portable computers.

A number of auxiliary structures and portable computer bus access techniques have been developed for permitting industry standard add-on cards to be associated with portable computers.

The auxiliary structures have, in some cases, resulted in rather bulky and space consuming housings. Such housings were not entirely satisfactory because of the increased weight, bulkiness or need of increased desk space.

The techniques for access to the portable computer bus as developed in the past have, in some cases, required the development of specialized hardware and/or add-on cards with the result that industry standard cards could not readily be utilized.

It is a primary object of the present invention to construct a card housing attachment (1) which permits a variety of industry standard cards to be readily accommodated and (2) which permits the card housing attachment to be conveniently and readily associated with the portable computer and (3) which does not require increased desk space and (4) which permits normal tilt back positioning of the display.

It is a related object to utilize the space on the top of the portable computer in the rear part of the portable computer behind the tilt-back display so that the card housing attachment occupies only space which (1) is otherwise not used and (2) which does not take away from usable space on a desk top.

It is another object of the invention to permit a variety of industry standard add-on cards to be readily accommodated.

It is another object of the present invention to construct the card housing attachment so that the attachment can be quickly and easily removed when the portable computer is to be operated as a portable computer without the need for an add-on card.

SUMMARY OF THE INVENTION

The card housing attachment is constructed for use with a portable computer of the kind having a battery tray compartment with an opening in a backside of the protective case of the portable computer. The portable computer has connectors at the inner end of the battery tray compartment for transmitting power, control signals and data between the main bus of the portable computer and an add-on card.

The card housing attachment comprises an upper card housing for mounting a selected add-on card or an expansion chassis within the card housing. The card housing is constructed so as to be located on the top side of the case near the back end of the portable computer when the card housing attachment is operatively associated with the portable computer.

The card housing attachment includes a battery compartment slide-in structure which is constructed to slide into and out of the battery compartment opening and to interfit closely with the interior wall structure of the battery compartment. A spacing and support frame structure holds the card housing and the battery compartment slide-in structure in a fixed, spaced apart relation so that the underside of the card housing will slide across and be disposed above the top side of the case as the battery compartment slide-in structure is progressively inserted into the battery compartment opening.

The card housing attachment includes innerconnect cards for connecting an add-on card in the card housing in operative association with the main bus of the portable computer. The innerconnect cards develop the power required for the add-on card and transmit all necessary control signals and data between the add-on card and the main bus of the computer.

Card housing attachment constructions and techniques which incorporate the features described above and which are effective to function as described above constitute further, specific objects of the present invention.

Other and further objects of the present invention will be apparent from the following description and claims and are illustrated in the accompanying drawings, which by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

BRIEF DESCRIPTION OF THE DRAWING VIEWS

FIG. 1 is an isometric view of a portable computer of the general kind with which the card housing attachment of the present invention is utilized. FIG. 1 shows a card housing attachment constructed in accordance with one embodiment of the present invention and mounted in its operative position on the top, back part of the portable computer.

FIG. 2 is a side elevation view of the portable computer and associated card housing attachment shown in FIG. 1. In FIG. 2 the display is shown, in bold outline, tilted down and latched to the computer case in the position used for transport of the portable computer. The phantom outline in FIG. 2 shows how the display is tilted back to the operative position shown in FIG. 1.

FIG. 3 is a top plan view of the portable computer and associated card housing attachment shown in FIG. 2.

FIG. 4 is an elevation view of the back side of the computer and associated card housing attachment shown in FIG. 3.

Figure 5:
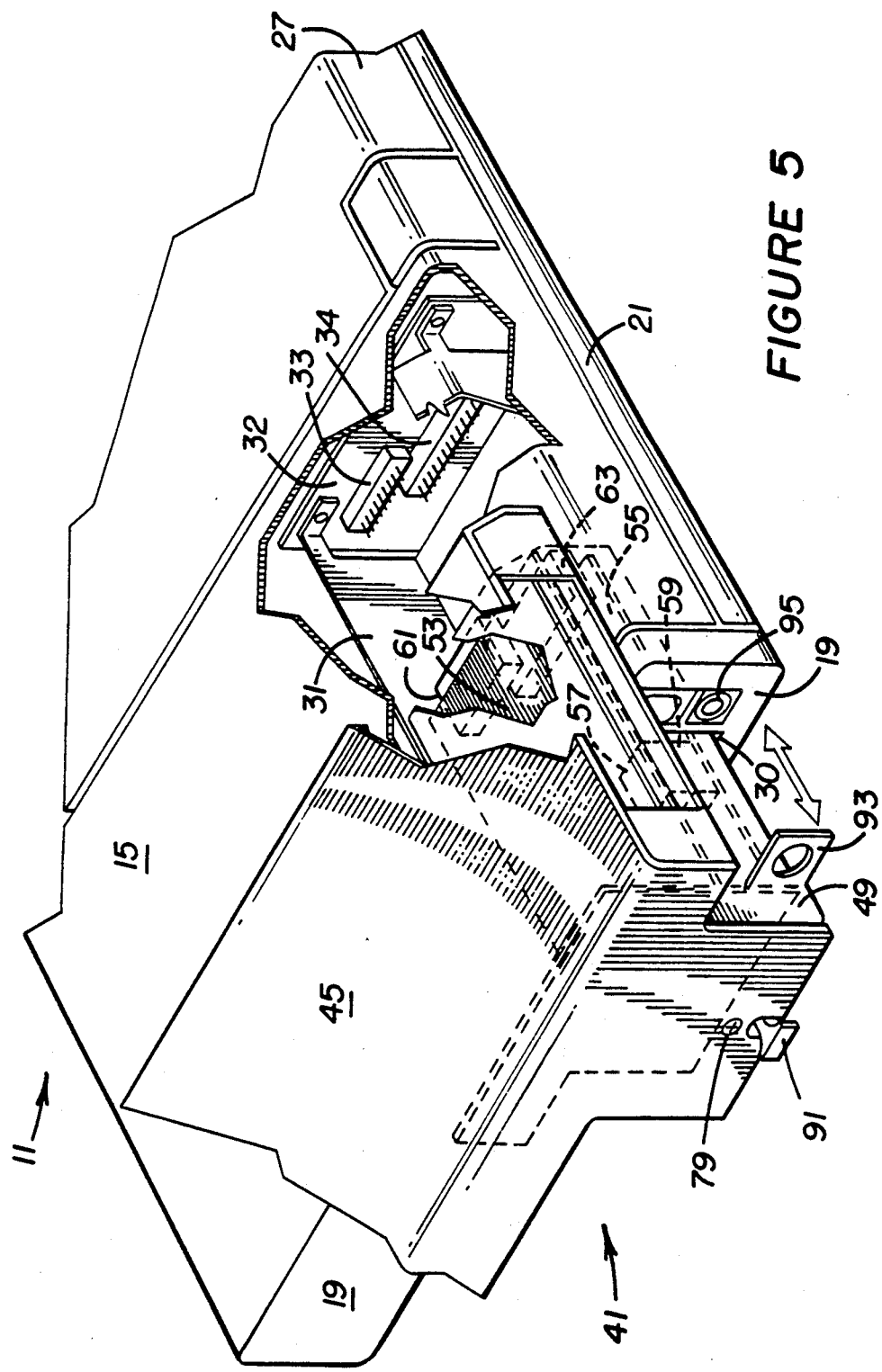

FIG. 5 is a fragmentary isometric view, partly broken away to show details of construction, and taken from the upper, back side of the portable computer. FIG. 5 shows how the battery compartment slide-in structure is insertable into a battery tray compartment opening and shows how the slide-in structure interfits closely with the associated internal wall structure of the portable computer battery tray compartment.

Figure 6:
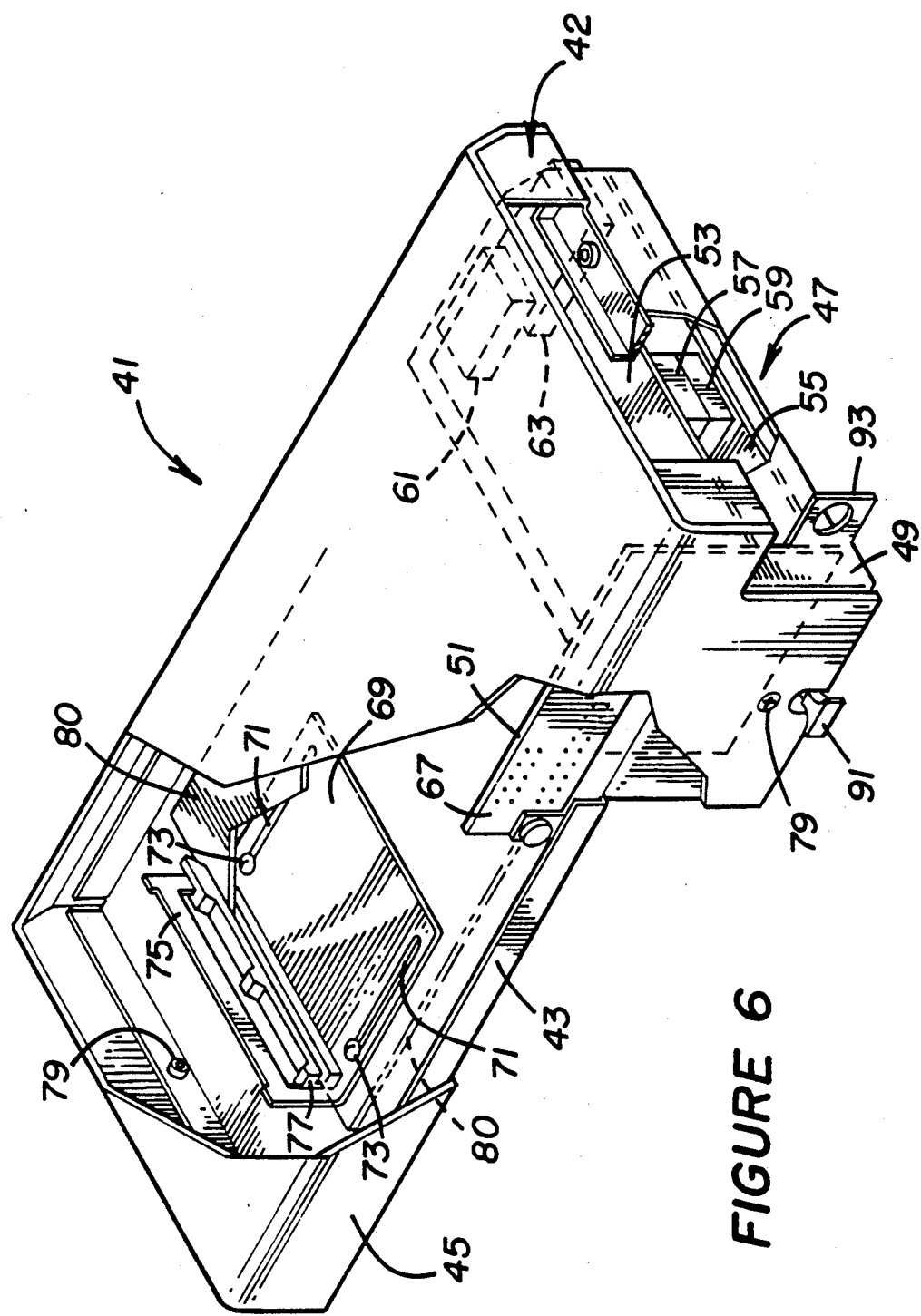

FIG. 6 is an isometric view, taken from the upper and back side, of a card housing attachment (by itself) constructed in accordance with one embodiment of the present invention. The card housing attachment shown in FIG. 6 is the same as that shown in association with the portable computer in FIGS. 1-5. In FIG. 6 some parts of the card housing have been broken away to show details of interior construction and some interior components within the card housing are shown in phantom outline.

FIG. 7 is a fragmentary, isometric view taken from the bottom side of FIG. 6, to show details of the battery compartment slide-in structure of the card housing attachment.

FIG. 8 is a cross sectional view, taken along the length of the manually releasable latch bar mechanism, to show how the manually releasable latch bar mechanism holds the battery compartment slide-in structure latched in place until the latch bar is manually actuated to permit the battery cavity slide-in structure to be withdrawn from the battery cavity of the portable computer.

FIG. 9 is an isometric view, taken from the bottom side of the manually actuated latching bar, to show details of the structure of this latch bar mechanism.

DETAILED DESCRIPTION OF THE PREFERRED EMBODIMENTS

FIG. 1 is an isometric view of a portable computer 11 of the general kind with which the card housing attachment of the present invention is utilized. FIG. 1 shows a card housing attachment 41, constructed in accordance with one embodiment of the present invention, mounted in the operative position on the top, back part of the portable computer 11.

The portable computer 11 has an outer case 13. The outer case has a top 15, a bottom 17, a back end 19 and two sides 21 and 23.

A display 25 is mounted within a display frame 27, and the display frame 27 is pivotally connected to the outer case 13 so that the display frame 27 can be pivoted back and forth between the inclined viewing position (shown in FIG. 1) and a closed position (shown in FIG. 2) in which the display frame covers keyboard 29 (see FIG. 1).

The portable computer 11 is of the general kind described and illustrated in U.S. Pat. No. 4,571,456 issued Feb. 18, 1986 to Paulsen, et al.; U.S. Design Pat. No. DES. 280,511 issued Sept. 10, 1985 to Moggridge, et al.; and U.S. Design Pat. No. DES. 280,622 issued Sept. 17, 1985 to Moggridge, et al.

The portable computer 11 incorporates a slide-in battery tray compartment comprising an opening 30 in the back end 19 (see FIG. 5). The battery tray compartment has interior wall structure 31 and a plug in board 32 located at the inner end of the battery compartment.

The plug in board 32 has connectors 33 and 34 which connect to the main logic board (not shown) of the portable computer. The connectors 33 and 34 provide access to the power, control signals and data lines of the main bus of the computer. The structure and components of the battery tray compartment shown in FIG. 5 and in the other drawing views of this application are the same as described and illustrated in co-pending U.S. application Ser. No. 07/252,177 filed Sept. 30, 1988 by Dennis R. Mitchell, et al., and assigned to the same assignee as the assignee of this application. Each of the three U.S. patents listed immediately above (U.S. Pat. No. 4,571,456; U.S. Design Pat. No. DES 280,511 and U.S. Design Pat. No. DES 280,622) and the pending U.S. application Ser. No. 07/252,177 filed Sept. 30, 1988, listed immediately above, is incorporated by reference in this application in accordance with the provisions of Section 608.01(P)(B) of the *Manual of Patent Examining Procedure* of the U.S. Patent and Trademark Office.

In accordance with the present invention a card housing attachment 41 (best shown in FIG. 6) plug-ins into the main bus through the battery compartment tray and provides an upper card mounting compartment (1) which is located on the top rear part of the portable computer and (2) which is disposed neatly and compactly beneath and behind the screen when the screen is erected to the operative position shown in FIG. 1.

The card housing attachment 41 of the present invention permits industry standard half-cards and longer cards to be used with the portable computer 11.

A local area network (LAN) card is the most typical application, but any industry standard card can be used. The card housing attachment 41 of the present invention passes the bus through the card housing attachment to the add-on card and develops the power and any clock necessary for the half-card.

The card housing attachment 41 can be conveniently added to and removed from the portable computer 11.

The card housing attachment 41 is associated with the top and rear part of the computer 11 so as to require almost no additional desk space.

The card housing attachment permits the portable computer 11 to be used in multiple ways on the desk (by using various selected add-in cards) while providing the option of removal (for minimum size and weight of the portable computer) when the portable computer is used as a portable computer without a need for the added functions of the add-on card.

The card housing attachment of the present invention thus makes it quite easy and convenient to use a number of standard off-the-shelf, industry standard add-on card modules.

The card housing attachment of the present invention also permits the option of using the card housing attachment to go to a full expansion chassis for the portable computer 11.

As best shown in FIG. 6, the card housing attachment 41 comprises an upper housing 42 having a chassis 43 and an associated, removable cover 45.

As best shown in FIG. 7, the card housing attachment 41 comprises a battery tray compartment slide-in structure 47. The battery tray compartment slide-in structure 47 has top, bottom and side walls which interfit closely with the interior wall construction of the battery compartment of the portable computer 11 as the slide-in structure 47 is inserted into the computer and as the slide-in structure 47 is withdrawn from the computer 11 through the opening 30 (see FIG. 5).

The slide-in structure 47 is connected to and spaced from the chassis 43 of the upper card housing structure by a spacer and support frame 49 (best shown in FIG. 7). The frame 49 holds the upper card housing 42 and the lower battery compartment slide-in structure 47 in a fixed, spaced apart relation so that the underside of the card housing will slide across and will then be disposed above the top side 15 of the case 13 of the portable computer 11 as the battery compartment slide-in structure is progressively inserted into the battery compartment opening 30.

An add-on card 80 within the card housing 42 is operatively associated with the computer bus by an interconnecting card structure which is affective to develop the power and any clock timing required by the add-on card and which is effective to pass all required control signals and data lines from the bus to the add-on card while limiting EMI (electromagnetic imination) so that the system remains within regulatory requirements. The interconnecting card structure provides the power, control signal and data lines for industry standard XT type cards and AT type cards. In a specific embodiment of the present invention the interconnecting card structure includes a vertically extending interconnect card 51 (see FIG. 6). An upper horizontally extending card 53 and a lower horizontally extending card 55 within the slide-in structure 47 (see FIG. 6).

Connectors 57 and 59 detachably connect the top card 53 to the bottom card 55 (see FIG. 6) to transmit control signal and/or data lines from one card to the other card.

Connectors 61 and 63 at the inner end of the slide-in structure 47 (see FIG. 7) are engagable with the respective associated connectors 33 and 34 of the portable computer (see FIG. 5).

The upper and lower cards 53 and 55 may include a daughter card (not illustrated) for converting to the particular power and for voltage needed for a specific add-on card 80 contained within the upper housing 42.

As best illustrated in FIG. 6 the vertically extending interconnect card 51 has one or more sets of standard pin connectors for connecting to the edge connectors of an industry standard add-on card 80.

As also illustrated in FIG. 6, the chassis 43 has an adjustable bracket 69 formed with slots 71 so that associated screws 73 can be loosened or tightened to permit sliding of the bracket 69 along the length of the slots to accommodate different length add-in cards.

The bracket 69 has an upstanding part 75 which permits a limited amount of vertical movement of a slotted card edge mount 77.

The cover 45 can be removed from the chassis 43 by the taking out a number of removable screws 79 (see FIG. 6).

It is important that the card housing attachment 41 be retained securely in position when it is assembled in operative association with the portable computer 11. In accordance with the present invention a latch bar 81 is mounted in a slot 83 formed in a bottom wall 85 of the battery compartment slide-in structure 47 (see FIG. 7).

As best shown in FIG. 9 the bottom edge of the latch bar 81 is formed with an inclined ramp 87, and the inner end of the latch bar is connected to the slide-in structure 47 by a spring 89. When the latch bar 81 is manually pulled outward by a handle 91, the incline 87 rides up and over a retaining latch element 94 of the battery tray compartment to permit the entire slide-in structure 47 to be withdrawn through the opening 30 (see FIG. 5).

As best shown in FIGS. 5 and 6, the card housing attachment 41 includes a flange 93 which is aligned with the plug-in connector 95 of the portable computer 11. This location of the flange 93 requires the line cord connector 28 (which supplies the external power to the computer through the connector 95) to be disconnected before the battery compartment slide-in means can be inserted into the battery compartment opening 30. This prevents the add-in card from being connected to the computer bus at a time when power is supplied to the bus. The flange 93 is also shown in FIGS. 3 and 4.

In operation, a selected add-on card 80 is mounted within the card housing 42.

The battery compartment slide-in structure 47 is then inserted into the opening 30 (after the battery has been removed from the portable computer 11 and after the external power has been disconnected from the connector 95).

As the battery compartment slide-in structure 47 is fully inserted into the battery tray compartment of the portable computer 11 the connectors 61 and 63 interconnect with the respective connectors 33 and 34 (see FIG. 5). The external power is then reconnected to the computer 11 by inserting the fitting 28 (see FIG. 2) into the connector 95, see FIG. 5. At this point the computer 11 with the associated add-in card 80 in the card housing attachment 41 is ready for operation using external power. The computer and associated add-on card can be operated in an office as a desk top computer or in the field wherever external power is available.

The card housing attachment of the present invention permits industry standard and other add-in cards and even an expansion chassis to be readily associated with the portable computer 11 in a way which does not require modification to the portable computer 11 itself and in a way which does not require any additional desk space and in a way which does not interfere with the usual positioning of the display or other components of the portable computer 11.

The card housing attachment of the present invention can be removed or can be left in place when it is desired to transport the portable computer 11 from one location to another.

While we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims.

We claim:

1. A card housing attachment attached to a portable computer of the kind having an outer protective case comprising a top side and a back side, a bus within the case, a battery tray compartment having an opening in a back side of said case and connectors at the inner end of said battery tray compartment for connecting auxiliary devices to said bus of said portable computer, said card housing attachment comprising, card housing means for enclosing and mounting a selected add-on card adapted to be received within said card housing means and in a location on said top side of said case and near to said back side of said case, battery compartment slide-in means which are constructed to slide into and out of said battery tray compartment opening and to interfit closely with the interior wall structure of said battery tray compartment, spacing and support means for holding said card housing means and said battery compartment slide-in means in a fixed spaced apart relation so that the underside of said card housing means will slide across and then be disposed above said top side of said case as said battery compartment slide-in means are progressively inserted into said battery compartment opening, and interconnect means for connecting an add-on card adapted to be received within said card housing means in operative association with said bus of said portable computer.

2. The invention defined in claim 1 wherein said card housing means are constructed to be disposed across a small enough part of said top side of the case so as to permit a pivotal, erectable screen of said portable computer to be tilted back and partly over said card housing means whereby said card housing means occupy only a space which would otherwise not be used during operation of said portable computer.

3. The invention defined in claim 1 wherein said interconnect means comprise end connectors for connecting to said computer connectors located at the inner end of said battery tray compartment when said battery compartment slide-in means are fully inserted within said battery compartment opening.

4. The invention defined in claim 3 wherein said interconnect means include a power supply card for producing the proper voltage and power required for the selected add-on card mounted in said card housing means.

5. The invention defined in claim 3 wherein said interconnect means include an upper horizontally extending card and a lower horizontally extending card locating in said battery compartment slide-in means and also include a vertically extending card which extends from said card housing means to said battery slide-in means for transmitting control signals and data between the add-on card and said bus of said computer.

6. The invention defined in claim 1 wherein said card housing means include an adjustable card mounting slot structure for accommodating different length add-on cards within said card housing means.

7. The invention defined in claim 1 including releasable latching means for retaining said battery compartment slide-in means in position within said battery compartment opening until the releasable latching means are manually released.

8. The invention defined in claim 1 wherein said card housing attachment includes flange means for requiring external power to be disconnected from said portable computer before said battery compartment slide-in means can be inserted into said battery tray compartment opening to thereby prevent the add-in card from being connected to said computer bus at a time when power is supplied to said computer.

* * * * *